United States Patent Office 2,833,327
Patented May 6, 1958

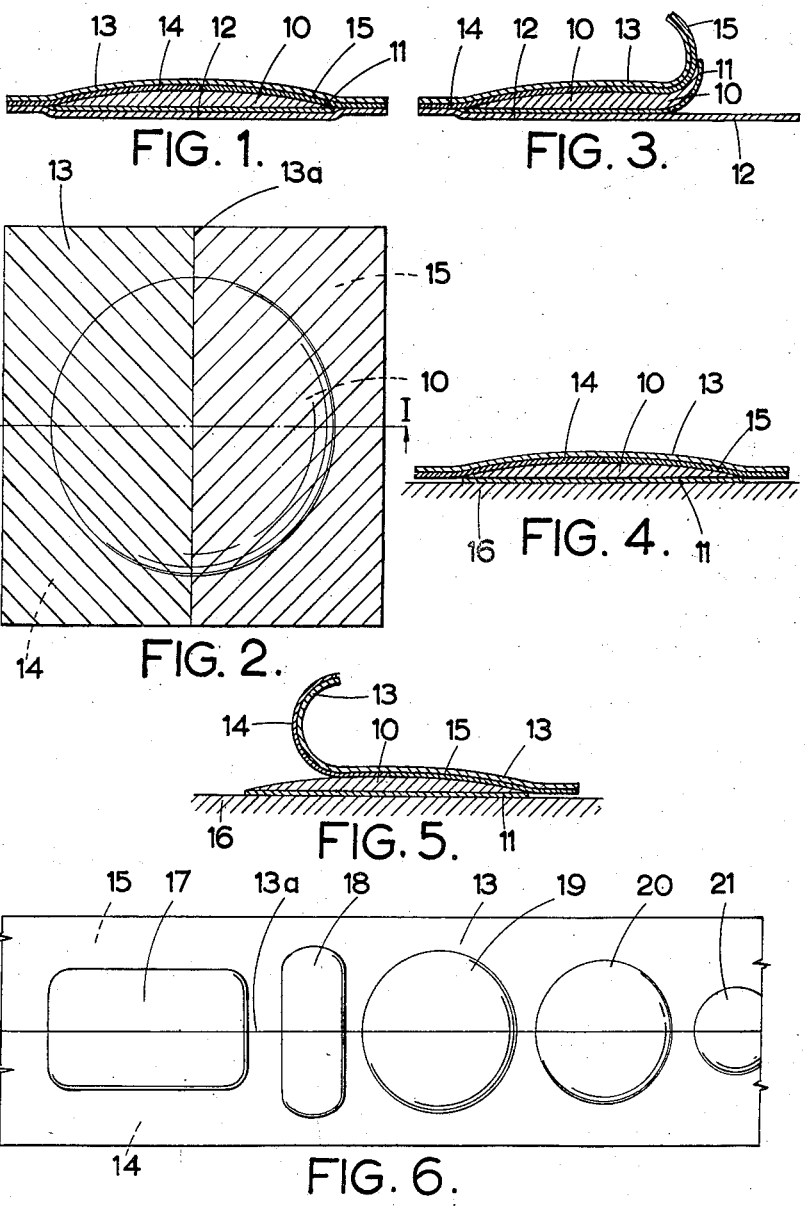

2,833,327

ADHESIVE REPAIR PATCHES

Reginald Donovan Boyce, Denham, England

Application August 24, 1954, Serial No. 451,893

Claims priority, application Great Britain August 28, 1953

5 Claims. (Cl. 152—367)

This invention relates to improved adhesive repair patches and is of particular, but not exclusive, importance in the manufacture of adhesive rubber patches for the repair of rubber pneumatic tyre tubes, in connection with which it will be described. It will be appreciated, however, that the invention is applicable to any type of repair patch arranged to be secured by an adhesive to an article to be repaired. In the manufacture of a patch, e. g. for repairing a tyre tube, the efficacy of the patch is dependent largely on the adhesive surface which is to be laid against the tube, and it is most undesirable that this adhesive surface should be touched by the fingers, since such handling causes it to lose some of its adhesive power. In addition, many patches are provided with bevelled or feathered edges so as to get a thin lip around the edge of the patch that will resist distortion or deformation and will not lift under conditions of stress. Such thin margins are again so delicate that handling may cause deterioration. Patches are generally provided on one or both sides with protective layers of material such as linens, paper or foil, which is peeled away just before the patch is applied, and it is during such peeling and during the application of the patch that the deterioration mentioned above may occur. It is therefore an object of the invention to provide a patch that can be properly protected during its storage life, and can yet be applied to the article to be repaired without being handled, thus avoiding the above mentioned deterioration.

According to the invention an adhesive repair patch has its front (operative) face coated with a first adhesive and protected by a first layer of sheet material, and its rear face protected by a second layer of sheet material secured thereto by second and third adhesives disposed side by side on said second layer, the bond provided by the second adhesive between the patch and the second layer being more tenacious, and the corresponding bond provided by the third adhesive being less tenacious, than the bond provided by the first adhesive between the patch and the first layer. If desired the second and third adhesives may be on separate strips of sheet material disposed side by side.

A plurality of such patches may be located at spaced intervals along and between strips of material constituting said first and second layers, the second layer having the second and third adhesive disposed thereon in bands.

The invention also includes a method of making the patches, which comprises the step of coating the second layer with alternate bands of the second and third adhesives and laying said second layer on a plurality of patches arranged in rows.

Embodiments of the invention will be described with reference to the accompanying drawings, in which:

Figure 1 is a diagrammatic cross-section of one form of patch,

Figure 2 is a plan thereof,

Figures 3, 4, and 5 are diagrammatic cross-sections of the patch showing successive stages of its application to a body to be repaired, and Figure 6 is a fragmentary plan of a strip of patches.

Referring to Figures 1 and 2, in one embodiment of the invention, and merely by way of example, a repair patch for a motor tyre inner tube comprises a main body 10 of rubber having one side coated with an adhesive 11 for subsequent affixing to the tube. The present invention is not concerned with the type of adhesive, which may be any suitable type, nor with the construction of the main body 10 of the patch, which is shown merely as a unitary structure, but may be feathered or tapered or made up of more than one layer in any way desired. The adhesive surface 11 is protected by a layer 12, conveniently of metal foil, extending an appreciable distance of the order of ¼ in. beyond the margin of the patch. The back of the patch is also protected by a sheet 13 of paper of similar dimensions and conveniently the layers form a rectangle with the patch disposed symmetrically at the centre thereof, as shown in Figure 2.

The protective layer of paper 13 is covered with two adhesives, termed the weak adhesive 14 and the strong adhesive 15 respectively, and for convenience coloured yellow and red respectively. The paper layer 13 is therefore divided by a line, indicated at 13a in Figure 2, into two differently coloured areas. The areas covered by the adhesives 14 and 15 are approximately equal, one half of the layer being covered by the yellow (weak) adhesive 14, and the other half by the red (strong) adhesive 15 and the boundary line 13a between the two adhesives crosses the middle of the patch. The bond provided by the yellow adhesive 14 between paper 13 and patch 10 is arranged to be weaker than the bond provided by the adhesive 11 on the operative face of the patch between patch 10 and foil 12 while the bond provided by the red adhesive 15 between the paper 13 and patch 10 is arranged to be stronger than the bond between the patch 10 and foil 12. Referring to Figures 3 to 5 in use, the patch is taken by the user, who peels the paper and the patch away from the metal foil 12, starting at the end of the paper 13 having the red adhesive, 15 (see Figure 3). This operation can be performed without disturbing the attachment of the patch 10 to the red adhesive 15, because the bond between the red adhesive 15 and the patch 10 is stronger than the bond between the patch 10 and foil 12. This operative face 11 of the patch 10 is now ready for application to the article to be repaired, but the patch can be handled by the protective paper layer 13 still attached to it without actually being touched by the user. This is of particular importance, not only on account of the sensitive adhesive surface of the patch, but because it obviates the risk of a feather edged patch being deformed or damaged at this edge. Referring to Figure 4, the patch 10 is laid over the surface 16 to be repaired and is pressed down in the usual way, and the adhesive surface 11 on the operative face is enabled to exert its full bonding effect, because it has not been touched or disturbed and is still at its maximum sensitivity. The paper layer 13 is still in position. Referring to Figure 5, when the patch 10 has been securely affixed to the article 16 to be repaired, the yellow end 14 of the paper protective layer 13 is peeled away from the patch 10. When all the yellow adhesive 14 has been peeled away, further tension on the paper 13 begins to peel away the red adhesive 15, starting at the middle of the patch 10. This is possible because the bond of the red adhesive 15 is less tenacious than the bond between the adhesive 11 of the patch 10 and the article 16 to be repaired, and the red portion 15 is being pulled away from the middle of the patch 10, which enables it to peel away without lifting the edges of the patch. It will be seen therefore, that the patch 10 has been applied without either its operative face 11 or its margin having been subjected to any deteriorating influences.

A convenient method of manufacture of patches according to the invention is to mount them between strips of foil and paper at conveniently spaced intervals. For such a plurality of patches, an example of which is shown in Figure 6, the strip of paper 13 is coated along its length with two bands of equal breadth of the yellow and red adhesives 14 and 15 respectively, and contiguous along the line indicated at 13a. At a convenient stage in manufacture this strip of paper 13 is laid on the patches which are already disposed on the foil in the required pattern. The patches may be of any required size or shape and an exemplary range is shown at 17, 18, 19, 20 and 21. The strip 13 may itself be formed of two separate strips, each bearing adhesive 14 or 15 and contiguous at 13a. Instead of a single strip to produce a single line of patches, the operation may be performed with sheets, each sheet comprising a plurality of rows of patches, and in this event the paper sheet is coated with alternate bands of red and yellow adhesive. The areas of any given patch covered by the weak and strong adhesives 14 and 15 need not necessarily be equal. Thus, if desired, two-thirds or three-quarters of the patch may be covered with the strong adhesive, and the remainder with the weak adhesive.

Instead of the second and third adhesives being coloured yellow and red, other identification means may be employed. For example, the paper or other protective layer may itself be coloured or may have printed signs, letters, or words thereon, so disposed that a user taking a patch ready for use is given the requisite guidance as to which end must be peeled off first.

Instead of the paper and metal foil described above any other protective layers may be employed.

I claim:

1. An adhesive rubber patch comprising, a rubber body member having a pair of opposite surfaces and an extremely thin peripheral lip, a first protecting sheet member affixed over one of said surfaces by a first adhesive permitting the sheet member to be peeled from the body member, a second protective sheet member affixed over the second of said surfaces by bands of second and third adhesives permitting peeling off of said second member, said second and third adhesive bands disposed side by side on the second member with a boundary line therebetween traversing a medial portion of said body member, said sheet members having adhesive-free facing areas thereof protruding beyond said body member, the bond provided by said second adhesive between the rubber body and second sheet member being more tenacious than the bond provided by said first adhesive and the corresponding bond provided by said third adhesive being less tenacious than the bond provided by the first adhesive, whereupon said sheet members may be successively peeled from the body member without distorting the said lip.

2. An adhesive repair patch as claimed in claim 1, wherein the second and third adhesives are carried on separate strips of sheet material disposed side by side and together constituting said second sheet member.

3. An adhesive repair patch as described in claim 1 in which the areas of said second member adhered to the body member are provided with indicia means to identify the second and third adhesives.

4. A method of making repair patches comprising affixing on a first protective sheet member coated on one surface thereof with an adhesive a plurality of rubber body members arranged on said adhesive coated surface in a row spaced apart along the length of the sheet member, coating a second protective sheet member with longitudinally extending alternate juxtaposed bands of second and third adhesives providing bonds with the second sheet member which are respectively lesser and greater in strength than that provided by the first adhesive with the first sheet member, and laying the second sheet member over said first sheet member with the bands in contact with the body members.

5. A method as described in claim 4 in which said second and third adhesives are arranged to have substantially equal areas thereof in contact with any given body member.

References Cited in the file of this patent

UNITED STATES PATENTS

| 1,678,341 | Kaber | July 24, 1928 |
| 2,638,955 | Gruber | May 19, 1953 |

FOREIGN PATENTS

| 26,706 | Great Britain | 1910 |